United States Patent [19]

Hoyer

[11] Patent Number: 4,817,154

[45] Date of Patent: Mar. 28, 1989

[54] METHOD AND APPARATUS FOR ENCODING AND DECODING SPEECH SIGNAL PRIMARY INFORMATION

[75] Inventor: Elmer A. Hoyer, Wichita, Kans.

[73] Assignee: NCR Corporation, Dayton, Ohio

[21] Appl. No.: 939,971

[22] Filed: Dec. 9, 1986

[51] Int. Cl.[4] .............................................. G10L 5/00
[52] U.S. Cl. ........................................ 381/36; 381/37; 381/43; 381/53
[58] Field of Search ...................... 381/31, 36, 37, 43, 381/42, 41, 40, 53; 340/347 AD; 364/513.5; 341/126, 127, 128, 157, 155

[56] References Cited

U.S. PATENT DOCUMENTS 4,477,925  10/1984  Avery et al. .
4,707,857  11/1987  Marley et al. .................... 381/43
4,713,777  12/1987  Klovstad et al. ............... 364/513.5
4,713,778  12/1987  Baker ............................... 364/513.5
4,763,278   8/1988  Rajasekaran et al. .......... 364/513.5

Primary Examiner—William M. Shoop, Jr.
Assistant Examiner—Brian Young
Attorney, Agent, or Firm—Wilbert Hawk, Jr.; Edward Dugas

[57] ABSTRACT

An encoder, decoder and method is provided with each being usable independently of each other for improving the dynamic range of digitized speech signals systems by providing amplitude and frequency components to the digitized signals. The encoder processes a speech signal by first converting the speech signal to a single sideband signal and then passing that signal along two signal paths. The first signal path includes an envelope detector and a digitizing means for forming a first digitized signal having amplitude information. The second signal path includes a clipper, frequency-to-voltage converter and digitizer means for forming a second digitized signal havig frequency information. Both digitized signals may then be transmitted to the decoder for reconstruction or stored for reconstruction at a later time. The signals may be transmitted in parallel or serially using multiplexing techniques.

7 Claims, 17 Drawing Sheets

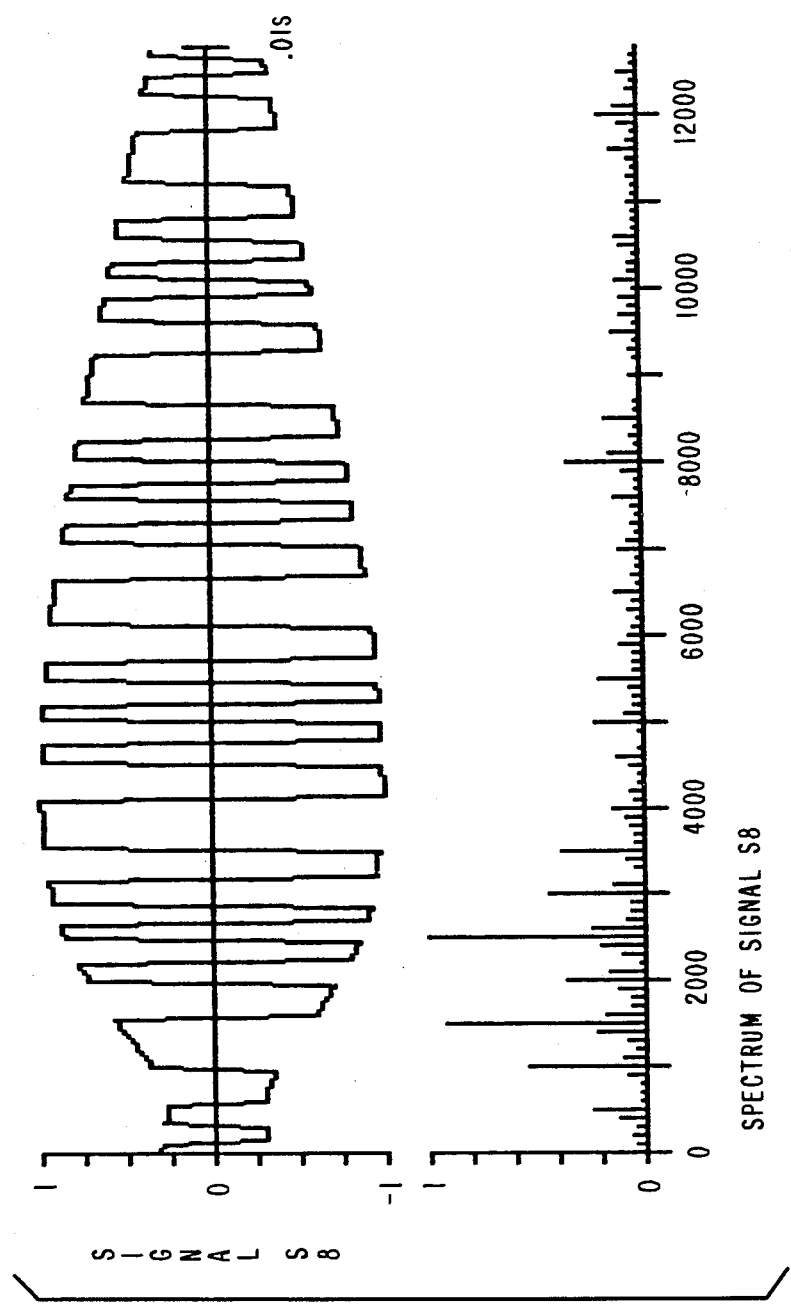

METHOD AND APPARATUS FOR ENCODING AND DECODING SPEECH SIGNAL PRIMARY INFORMATION

BACKGROUND OF THE INVENTION

The present invention relates generally to the field of digital transmission systems for transmitting speech signals and somewhat more specifically to the field of conditioning speech signals so that they can be used as inputs to computerized systems. More particularly, the present invention extracts from an analog speech signal amplitude and frequency information and converts that information to digital data and vice versa.

Ordinary sampled speech signals, particularly those sampled at a low sample rate, have an unnatural sound and are fatiguing to listen to over long periods of time. It is therefore desirable to process these types of signals in such a way that the components, generally amplitude and frequency components, that would add to the quality of the reproduced speech signals are made a part of the sampled signal. It is also desirable to remove the primary information (amplitude and frequency) information from the speech signal without retaining the speech signal itself or any modified form of the speech signal.

A publication of interest for its teachings of conditioning speech signals is entitled "Automatic Conditioning of Speech Signals", *IEEE Trans. on Audio, etc.*, June 1968, pp. 169–179, by H. Ellwarth et al. In that paper, it is disclosed that a speech signal may be digitized and the amplitude clipped with the result that the remaining signal will still bear a resemblance to the original signal such that the signal may be processed to produce recognizable speech.

A patent of interest for its teaching on clipped speech signal processing is U.S. Pat. No. 4,477,925, entitled "Clipped Speech-Linear Predictive Coding Speech Processor", by J. M. Avery et al. which patent is assigned to NCR Corporation, the assignee of the present application. In this patent, there is disclosed a system and a method which analyzes sampled clipped speech signals for the purpose of identifying the original utterance. A sampler generates, from the clipped signal, a plurality of discrete binary values. A processor is used to analyze the sampled binary values to compare them against stored digitized signals corresponding to a known spoken utterance. Comparisons are made using linear predictive coefficients of an autocorrelation function of the utterances.

Another patent of interest is U.S. Pat. No. 4,015,088, entitled "Real-Time Speech Analyzer", by J. J. Dubnowski. The analyzer disclosed in this patent analyzes digital signal representations of a speech signal, which signal is threshold center-clipped and infinite peak-clipped to form a signal comprising three logic states. An autocorrelation function of the formed signal is determined by a circuit which then employs circuitry for continuously determining the pitch period of the applied speech signal.

Another patent of interest for showing the state of the art of speech processing using clipping is U.S. Pat. No. 3,974,336, entitled "Speech Processing System", by E. M. O'Brien. In this patent, it is taught that speech signals can be quantized in amplitude and time and a square wave squelch signal of relatively high frequency can be added and the sum amplified, clipped and quantized in time. By utilizing the proper detection circuitry and the squelch signal, the speech signal can be separated and cleanly removed from noise signals which occur between words.

Another patent of interest for its showing of a method for digitizing clipped speech and for squelching noise between words is U.S. Pat. No. 4,271,332, entitled "Speech Signal A/D Converter Using an Instantaneously - Variable Bandwidth Filter", by James C. Anderson.

Another patent of interest for its teaching is U.S. Pat. No. 4,070,550, entitled "Quantized Pulse Modulated Nonsynchronous Clipped Speech Multichannel Coded Communication System", by R. H. Miller, Jr. et al. In FIG. 5 of the patent, the process of speech clipping and digitizing an analog input waveform to impart amplitude and frequency information to a facsimile digital signal is shown in block and waveform illustrations.

As previously mentioned, sampled speech signals at low data rates have a very flat sound with noise between words which is unnatural and fatiguing to listen to. It therefore would be desirable to have a system which utilizes the advantages of digital speech signal processing but which adds to the reconstructed signal amplitude information and frequency information for reconstructing the naturalness and dynamic range of the reconstructed signal.

SUMMARY OF THE INVENTION

The present invention is directed to an encoder, a decoder, and an associated method which may be used independently for converting speech signals to digital signals and for reconstructing the speech signal from the digital signals such that the reconstructed signal is provided with a natural sound inclusive of an improved dynamic range.

The encoder of the subject invention receives as an input an audio signal which signal is converted to a single sideband signal that is processed along two signal paths, and first path converts the amplitude variations of the single sideband signal into a first digitized signal and the second signal path removes the amplitude variations through clipping and converts the frequency of the resulting signal into an analog voltage signal which is then converted to a second digitized signal. The first and the second digitized signals may be multiplexed into a single digital channel, if so desired, by any of several appropriate multiplexing means known by persons skilled in the art of signal processing.

The encoder output, whether as two separate signal channels or as a single multiplexed channel, may be applied to a data processing system for storage or analysis, or it may be directed immediately to the decoder for reconstruction of the audio speech signal. (If the encoder output has been multiplexed into a single channel, then prior to decoding, the receiving end will first provide the appropriate demultiplexing to recover the first and second digitized signals previously mentioned.)

The decoder of the subject invention receives the first and the second digitized signals and applies the second signal to a second signal path which includes a digital-to-analog converter, filter and voltage-to-frequency converter. The first signal is applied to a first signal path which includes a multiplying digital-to-analog converter and a filter. The multiplying digital-to-analog converter receives as an input the frequency signal from the voltage-to-frequency converter to provide, at its output, a reconstructed audio speech signal having the characteristics of naturalness and dynamic range.

BRIEF DESCRIPTION OF THE DRAWINGS

FIG. 13 illustrates a signal $S_8$ and its corresponding spectrum.

DESCRIPTION OF THE PREFERRED EMBODIMENTS

Figure 1:
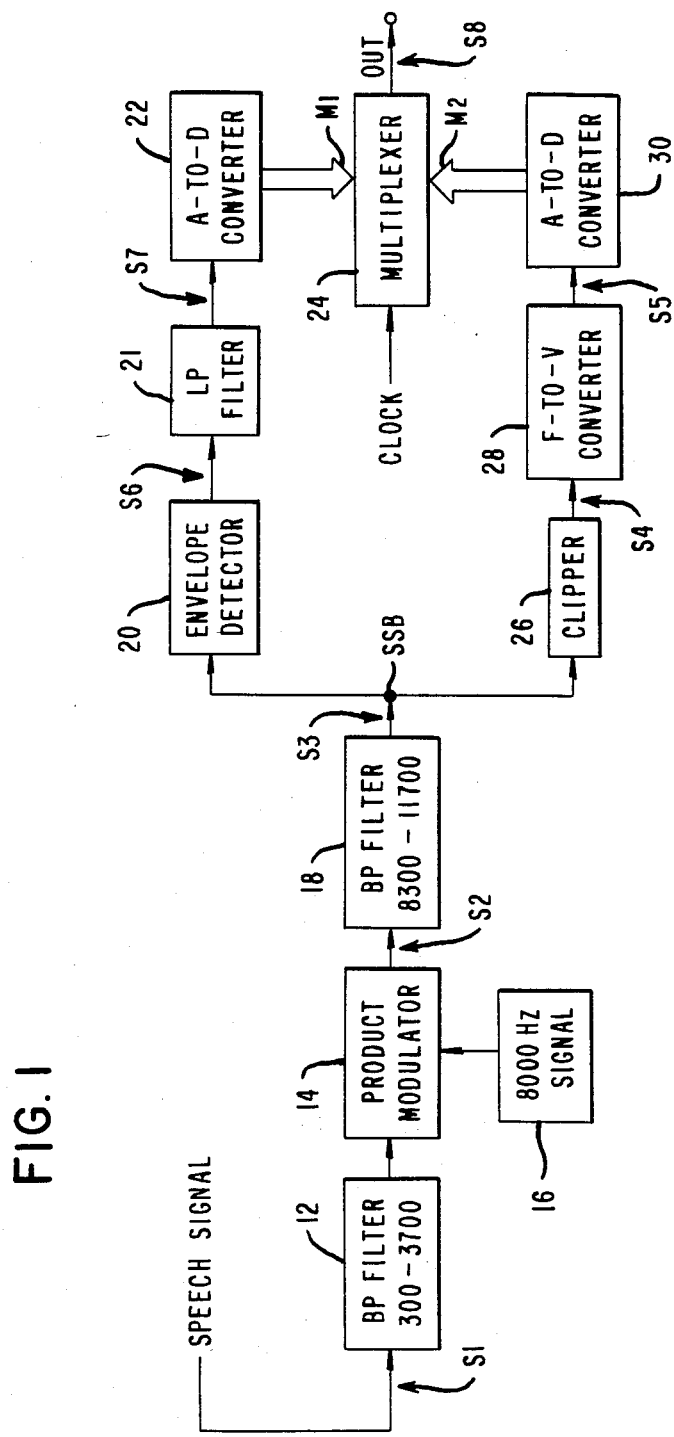
FIG. 1 is a block diagram of an encoder.
Figure 2A:
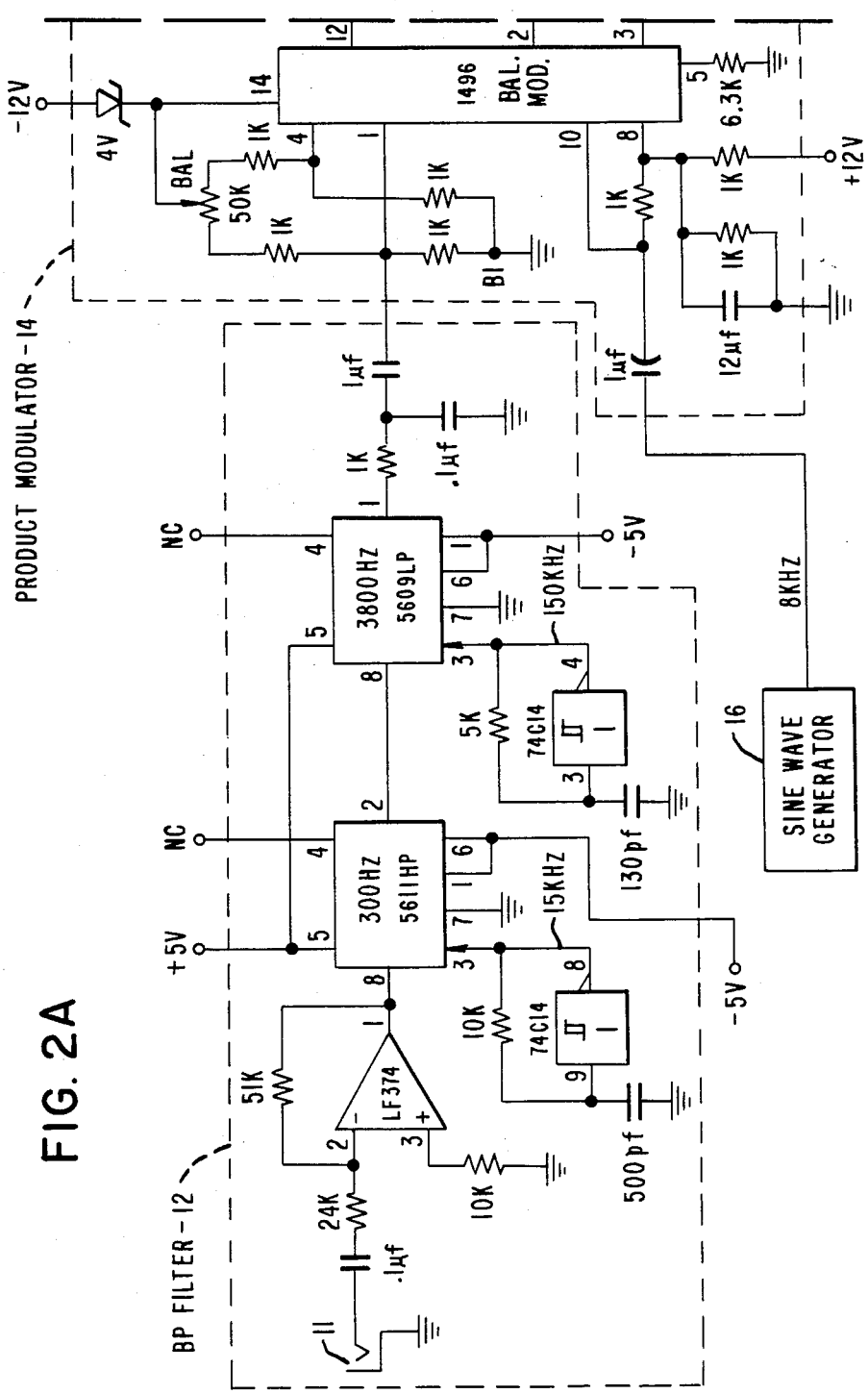
FIGS. 2A-2F, when assembled according to the map of FIG. 5, form a schematic diagram of the preferred embodiment of the encoder of FIG. 1.
Figure 2B:
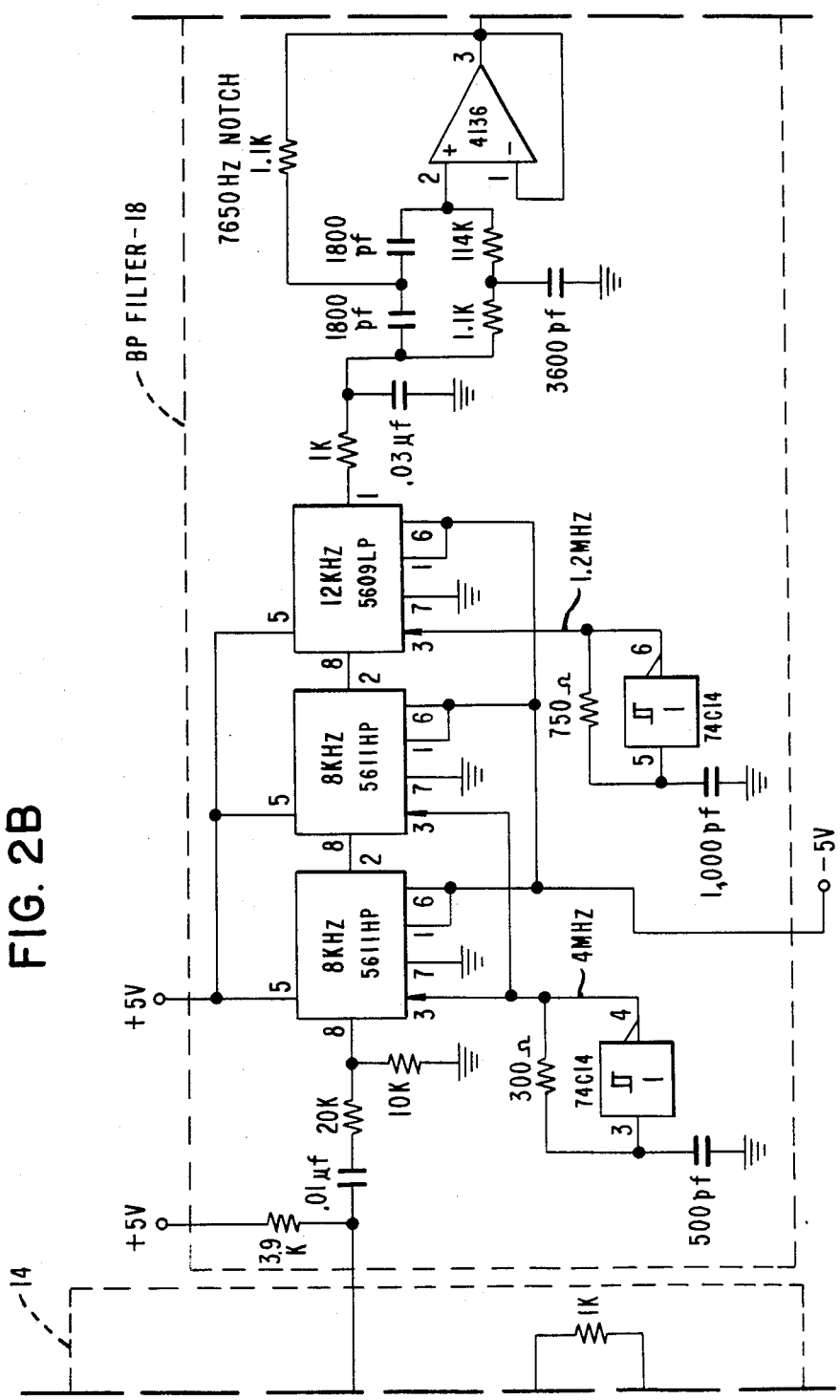
Figure 2C:
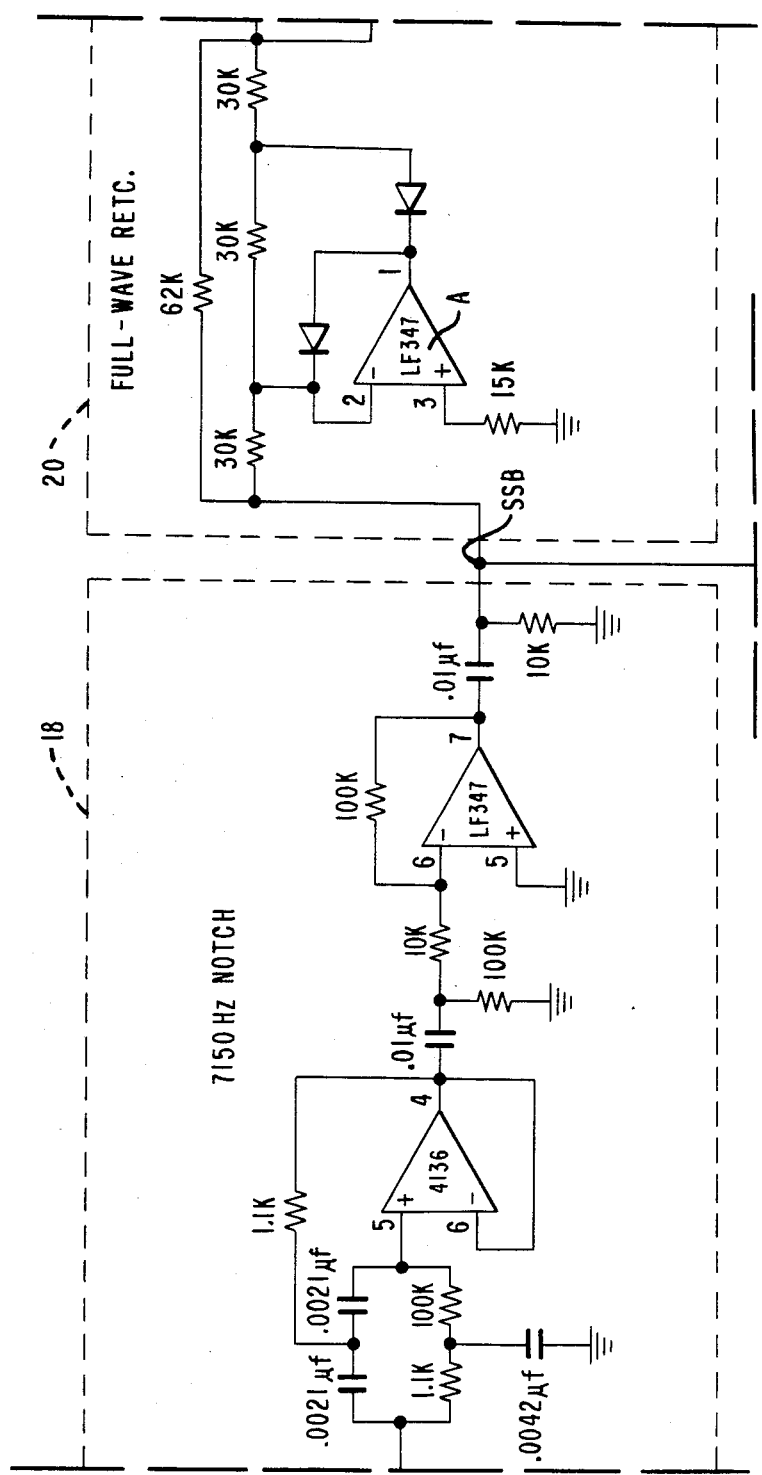
Figure 2D:
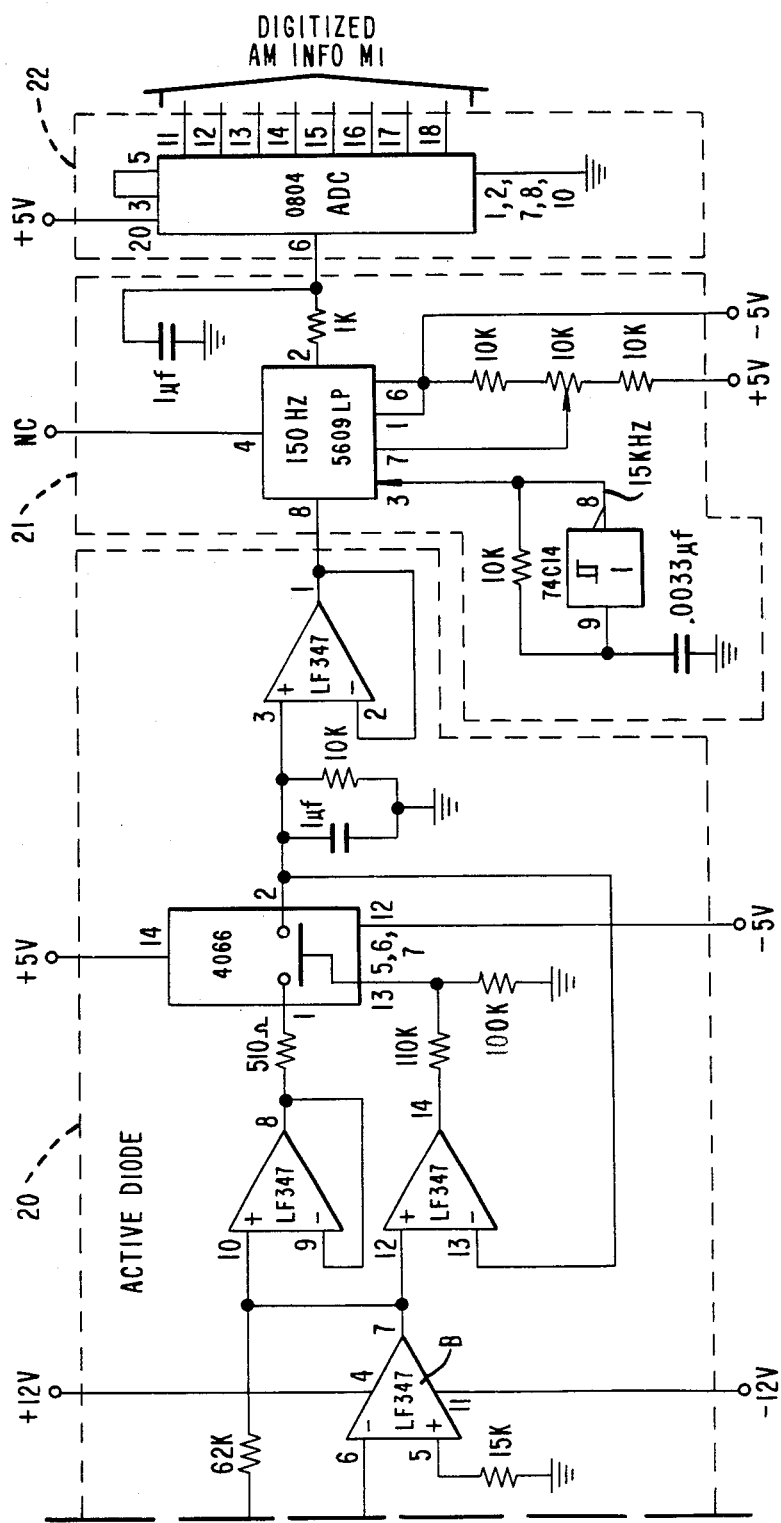
Figure 2E:
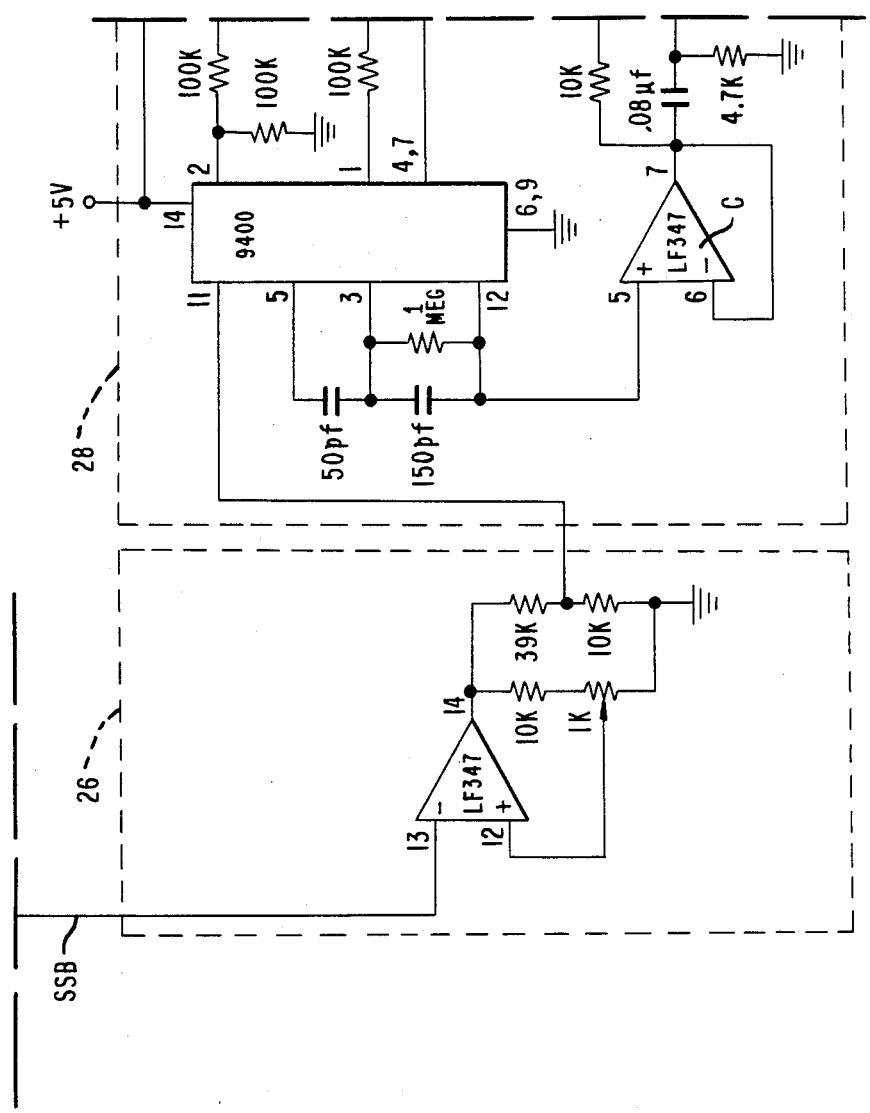
Figure 2F:
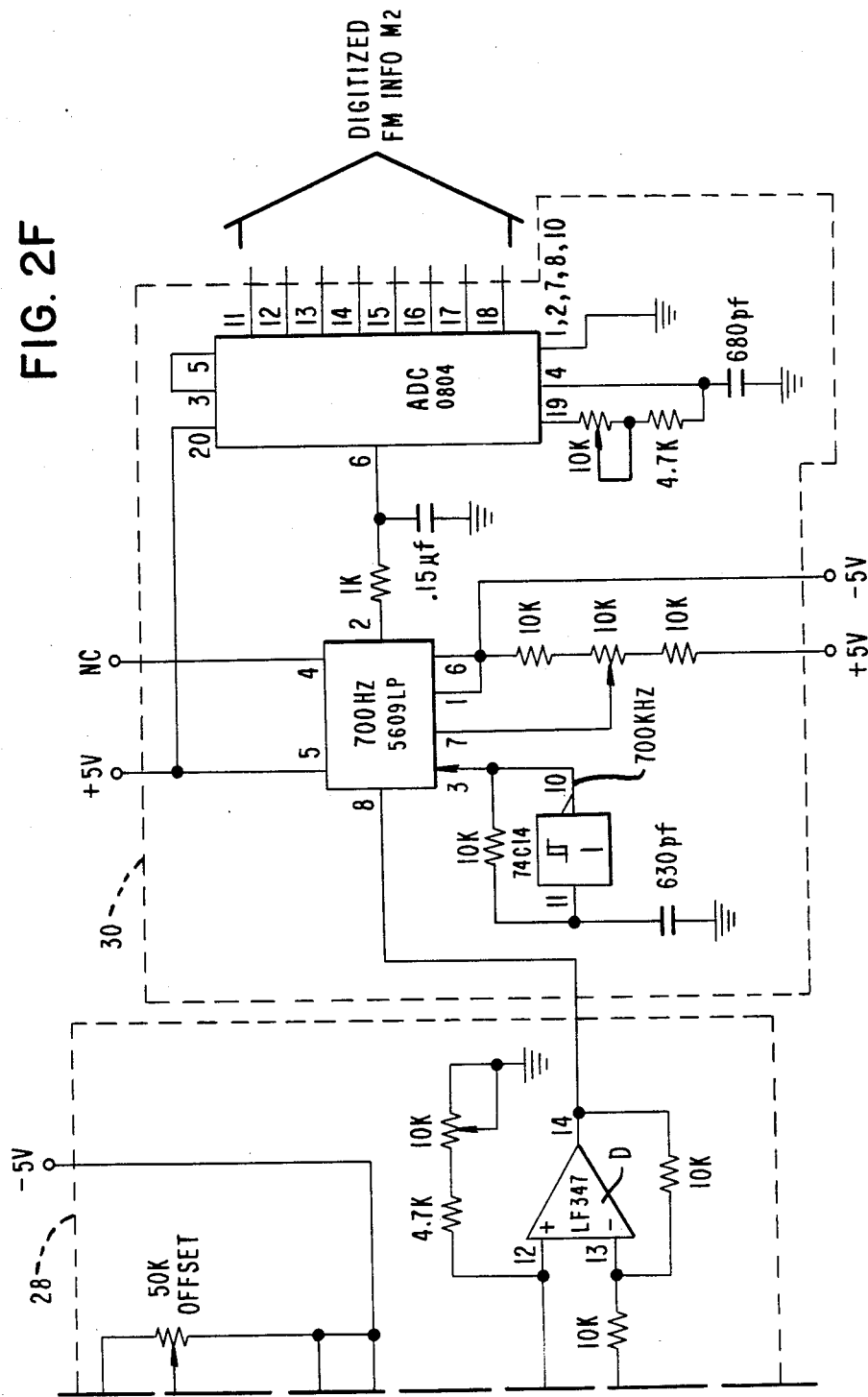

Referring to FIG. 1, wherein is illustrated a simplified block diagram of an encoder with a speech signal $S_1$ (shown in FIG. 6) applied to the input of a band-pass filter 12. The signals $S_1$ through $S_8$ are shown in FIGS. 6-13, respectively, along with their spectrums and are referenced at their occurrence locations in the encoder embodiment. The band-pass filter 12 limits the frequencies of the speech signal to the bandwidth of the standard telephone, namely $300H_z$ to $3.7KH_z$. The band limited speech signal from the filter 12 is applied to the input of a product modulator 14. The product modulator also receives as an input an $8KH_z$ signal which signal is generated by a sine wave generator 16. The product modulator functions to create a double sideband-suppressed carrier signal $S_2$ (shown in FIG. 7). That signal is forwarded to a band-pass filter 18, having a pass band between 8.3 $KH_z$ and 11.7 $KH_z$. The signal $S_3$ (shown in FIG. 8) from the band-pass filter 18 has the same bandwidth as the signal from the band-pass filter 12 but, the signal has been translated by $8KH_z$. The signal $S_3$ is a single sideband signal (SSB) that is additionally designated SSB, which is directed along two signal paths. The first signal path is comprised of, an envelope detector 20, a low pass filter 21, and an A (analog) to D (digital) converter 22. The second signal path is comprised of, a clipper 26, an F (frequency) to V (voltage) converter 28, and an A-to-D converter 30. The output signal from the A-to-D converter 22, denoted $M_1$, is directed to a first input of a multiplexer 24. The output signal from the A-to-D converter 30, denoted $M_2$, is directed to a second input of the multiplexer 24. A clock signal controls the multiplexer so as to time division multiplex the signals $M_1$ and $M_2$ to an output terminal labeled, OUT. The signal on the output terminal is $S_8$ (shown in FIG. 13).

Figure 11:
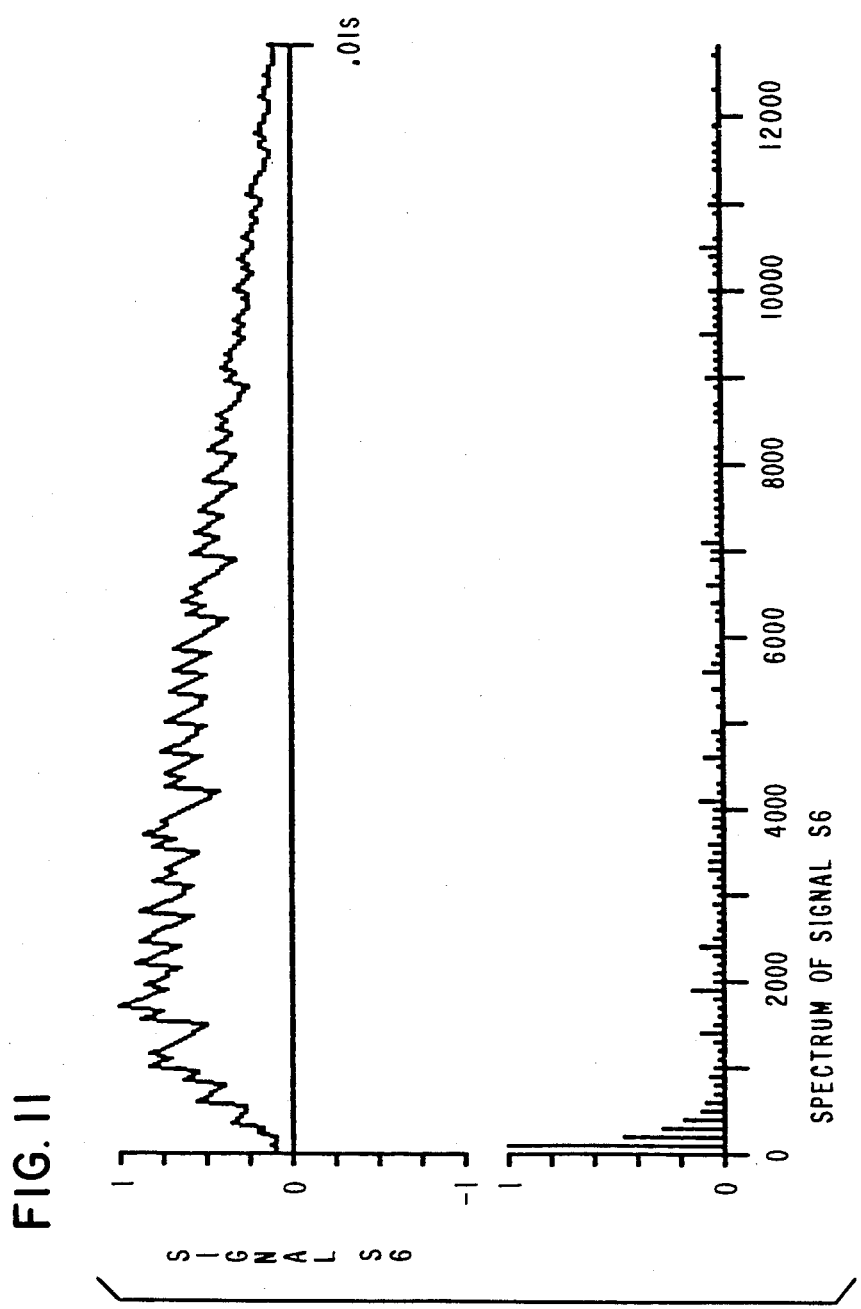
FIG. 11 illustrates a signal $S_6$ and its corresponding spectrum.
Figure 12:
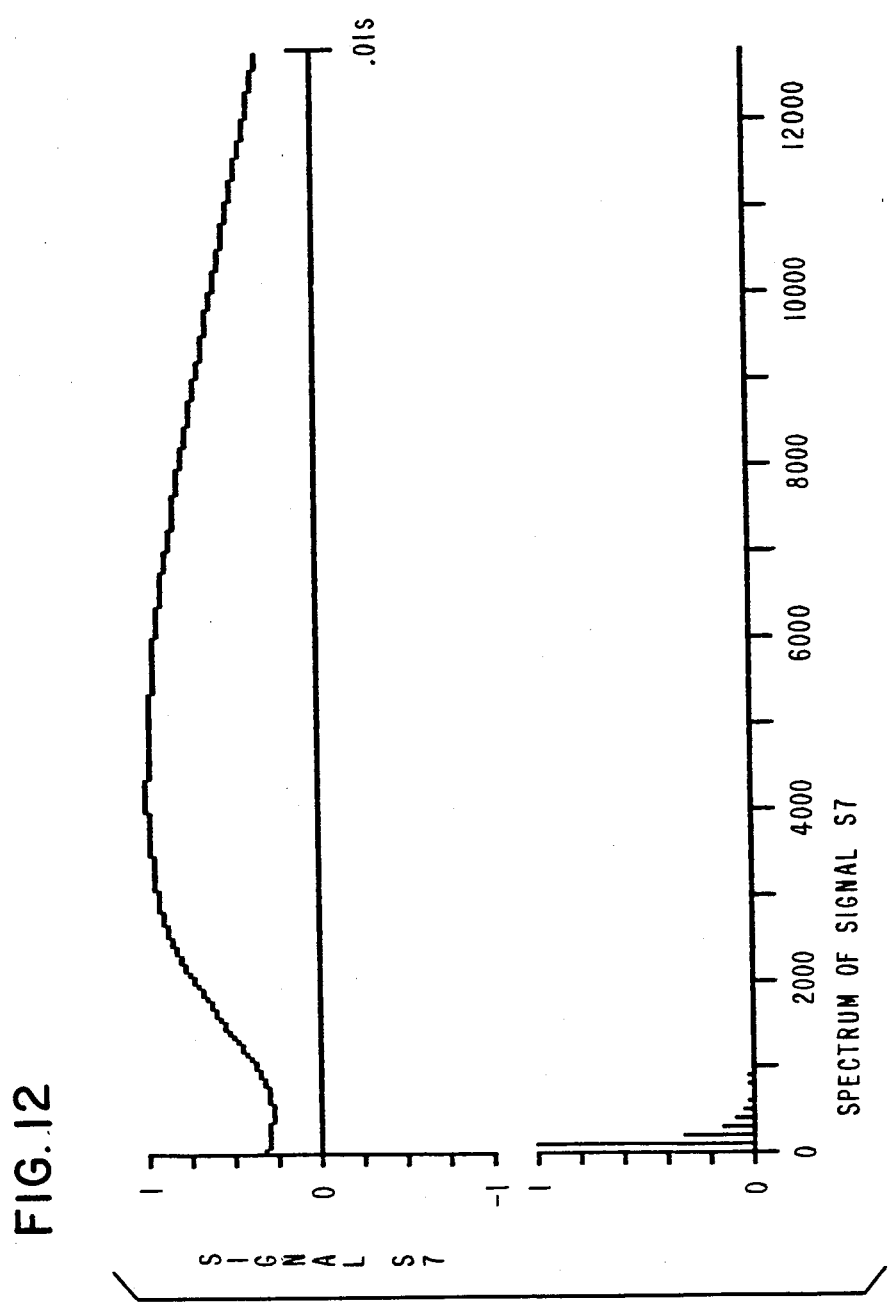
FIG. 12 illustrates a signal $S_7$ and its corresponding spectrum.

Referring back to the first signal path, the envelope detector 20 operates to demodulate the amplitude information from the SSB signal to provide the signal $S_6$ (shown in FIG. 11). The demodulated signal has a bandwidth of approximately 140 Hz for speech signals. The demodulated signal from the envelope detector 20 is then filtered to provide the signal $S_7$ (shown in FIG. 12) which signal is then digitally encoded by the A-to-D converter 22 to provide the signal $M_1$. The number of bits that form the signal $M_1$ is determined by the resolution desired.

Figure 9:
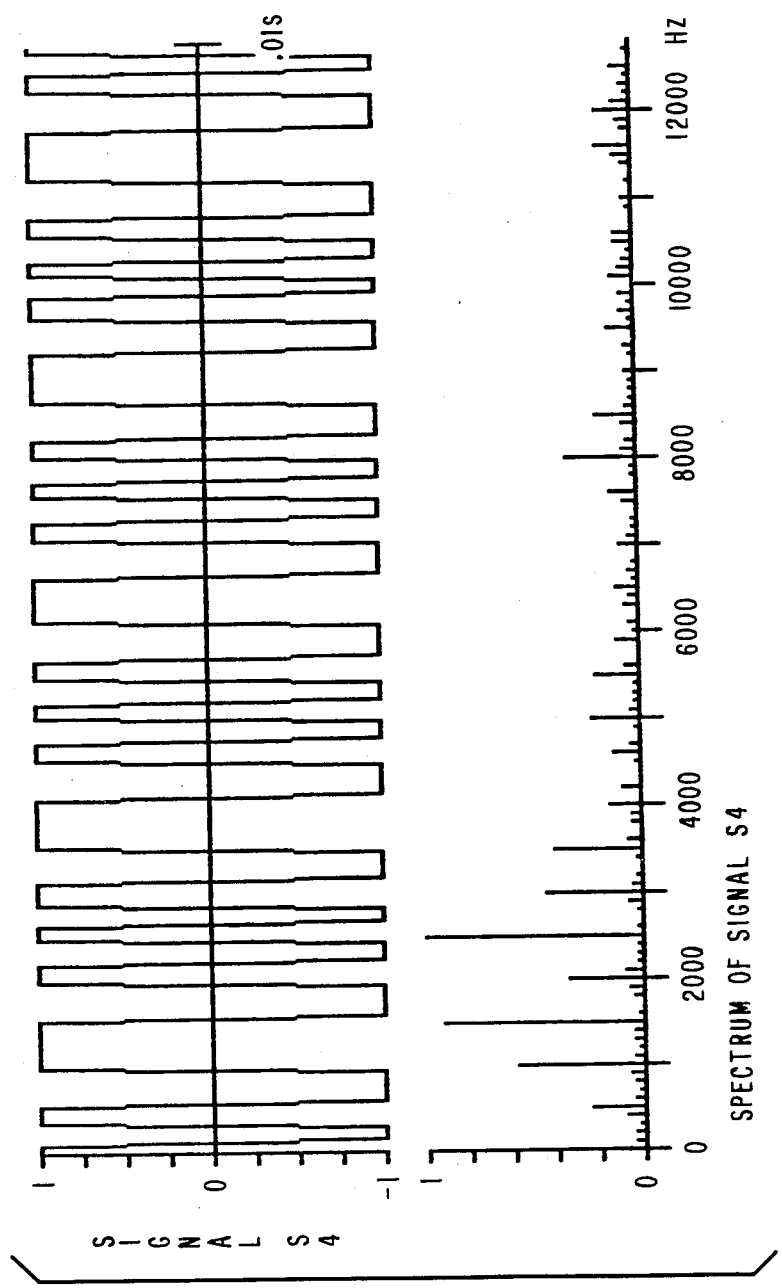
FIG. 9 illustrates a signal $S_4$ and its corresponding spectrum.
Figure 10:
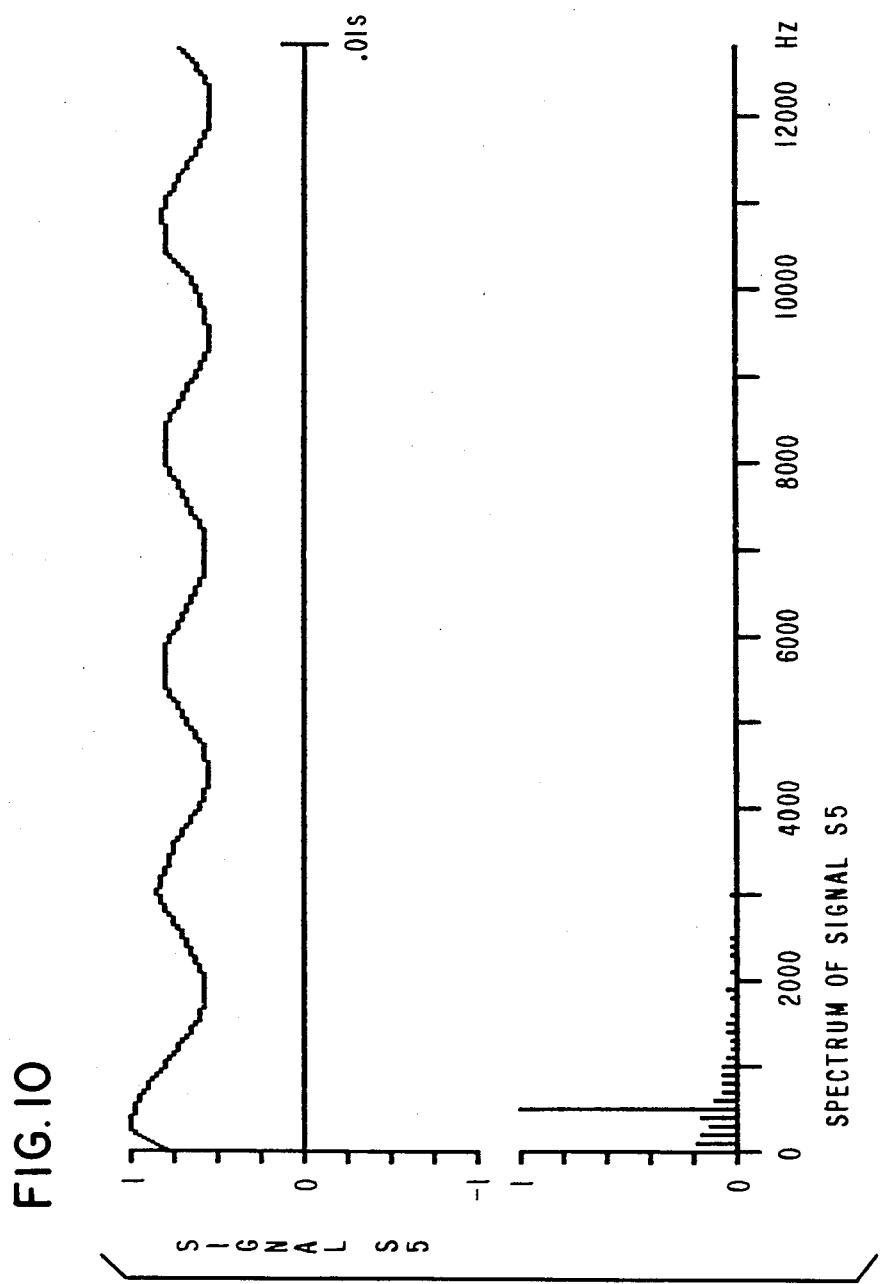
FIG. 10 illustrates a signal $S_5$ and its corresponding spectrum.

Referring back to the second signal path, the clipper 26 operates to remove all amplitude variations from the SSB signal to provide the clipped signal $S_4$ (shown in FIG. 9). The clipped signal is then passed to the F-to-V converter 28. The output signal $S_5$ (shown in FIG. 10) from the F-to-V converter is a voltage which is proportional to the instantaneous frequency of its input signal.

The signal from the F-to-V converter 28 has a bandwidth of about $700H_z$ and is digitally encoded by the A-to-D converter 30 to provide the signal $M_2$.

The output signals $M_1$ and $M_2$ are multiplexed, by multiplexer 24, to form a serial bit stream whose bit rate is determined by the number of bits chosen to represent a sample of $M_1$ and the number of bits chosen to represent a sample of $M_2$. The FIG. 1 encoder and the associated description thus shows and describes an apparatus for removing the primary information of both amplitude and frequency of a speech signal without retaining the speech signal itself.

Figure 5:
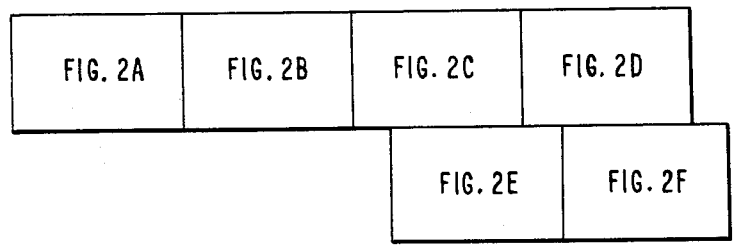
FIG. 5 is a map illustrating the assembly of FIGS. 2A-2F.

Referring to FIGS. 2A through 2F, assembled in accordance with the map of FIG. 5, wherein a detailed preferred circuit embodiment of the encoder of FIG. 1 is illustrated with the electronics for each of the major blocks of FIG. 1 outlined with dotted lines; the band-pass filter 12 is comprised of, a wide bandwidth operational amplifier LF347 of the type manufactured by National Semiconductor Inc., a 5611, five-pole Chebyshev high-pass filter and a 5609, seven-pole, six-zero, elliptic, low-pass filter of the type manufactured by EG&G Reticon, and a pair of 74C14 Schmitt triggers of the type manufactured by Texas Instruments. The Schmitt triggers are connected as oscillators to provide a $15KH_z$ signal and a $150KH_z$ signal. In operation, an analog speech signal is applied to the input of the LF347 amplifier via a jack 11 and the associated serially connected 0.1 mf capacitor and 24K resistor. The amplified signal from the LF347 amplifier is directed to the input 8 of the 5611 high-pass filter which filter is a switched capacitor filter that is tuned by the $15KH_z$ signal applied to the input 3. In the preferred embodiment, the $15KH_z$ signal provides the desired $300H_z$ pass threshold. The output signal from the 5611 high-pass filter's output 8, is directed to the input 8 of the 5609 low-pass filter wherein signals having a frequency above $3.8KH_z$ are blocked. The associated oscillator generates a signal of $150KH_z$ that is applied to the input 3 to provide the desired $3.8KH_z$ cut-off. The output signal, on output 1, is the bandpass filtered signal, which is now a modulation signal that is directed to the input 1 of a 1496 balanced modulator of the type manufactured by Motorola. The 1496 modulator also receives a sine wave carrier signal from a sine wave generator 16. The sine wave carrier-signal is 0.8V peak-to-peak with a frequency of $8KH_z$. The modulator operates in a push-pull manner to provide an output signal which contains two sideband signals with a suppressed carrier signal.

The output signal from the 1496 balanced modulator at output 12 is directed to the band-pass filter 18. The band-pass filter operates as a single sideband filter to preserve the upper sideband signal and to delete the lower sideband signal. The preserved upper sideband signal has a frequency range of 8.3KH$_z$ to 11.8KH$_z$. The filter 18 is comprised of, two cascaded 5611 high-pass filters, controlled by a single 74C14 oscillator operating at 4MH$_z$, and a 5609 low-pass filter, controlled by an oscillator operating at 1.2MH$_z$, a first and a second notch filter notched at 7.65KH$_z$ and 7.15KH$_z$, respectively, and comprised of 4136 operational amplifiers, and an LF347 wide bandwidth operational amplifier all connected in circuit as shown.

The two notching filters operate to remove any remnants of the upper portion of the lower sideband signal that may not have been removed by previous filters. The LF347 amplifier provides gain to the single sideband signal and couples the amplified signal, which is the SSB signal, to a like labeled terminal.

The signal on the terminal SSB terminal is directed, along a first path, to the envelope detector 20. The envelope detector 20 is comprised of two major circuits, the first is a linear full-wave rectifier and the second is an active diode. The full-wave rectifier is comprised of two LF347 wideband operational amplifiers labeled A and B and connected in circuit as shown. The rectified signal is directed to the inputs of the active diode circuit which circuit is comprised of two parallel connected LF347 operational amplifiers which, on one input, each receive the rectified signal from the full-wave rectifier circuit. The central element of the active diode is a 4066 bilateral switch device of the type manufacture by National Semiconductor. The output signal from the 4066 device, appearing on the output labeled 2, is connected to a charging circuit comprised of a parallel connected 1uf capacitor and 10K resistor and to an input 3 of a LF347 operational amplifier. In operation, if the input signal voltage exceeds the output voltage level of the 4066 device, the amplifier connected to the input labeled 1 will be switched into circuit with the charging circuit, causing the envelope detector output to rise towards the level of the input signal. If the input voltage of the 4066 device falls below the output voltage then the charging circuit is switched out of the circuit and the output is allowed to discharge. The envelope detector thus provides a signal which tracks the envelope of the rectified single sideband signal. The envelope signal is directed to a 5609 low-pass filter 21 having a cut-off frequency of 150H$_z$. A 74C14 oscillator provides a 15KH$_z$ signal at its output 8 to set the cut-off frequency of the 5609 device. The filtered output signal appearing at terminal 2 is directed to an A-to-D converter (ADC) circuit 22 comprised of an ADC 0804 device of the type manufactured by National Semiconductor. The ADC device uniformly samples the filtered envelope signal to provide the output signal M$_1$ which is an 8-bit successive approximation of the signal on its input. The signal M$_1$ is a digitized signal which carries the AM information contained in the analog input signal directed to the band-pass filter 12.

The SSB signal is directed, along its second path, to the input of the clipper circuit 26. The clipper circuit is comprised of an LF347 operational amplifier connected in circuit as shown. The SSB signal is amplified and clipped by the clipper circuit to remove all amplitude variations. The clipped signal is directed to the input of the F-to-V converter 28. The converter is comprised of a 9400 voltage-to-frequency, frequency-to-voltage converter device of the type manufactured by Teledyne Semiconductor, a buffer and a filter (smoother), comprised of LF347 operational amplifiers C and D connected in circuit as shown. The converter output signal is a signal having a voltage which is proportional to the instantaneous frequency of the input signal and a bandwidth of about 700H$_z$. That signal is forwarded to the A-to-D converter 30 which is comprised of a 5609 low-pass filter driven by a 74C14 oscillator at a frequency of 700KH$_z$, and an ADC 0804 A-to-D converter device connected in circuit as shown.

The low-pass filter is tuned to cut-off signal frequency components above 700 KH$_z$. The filtered output signal is directed to the input of the ADC 0804 device which device uniformly samples the filtered signal to provide the output signal M$_2$. The output signal M$_2$ is an 8-bit successive approximation of the FM information contained in the audio speech signal directed to the input of the bandpass filter 12.

Figure 3:
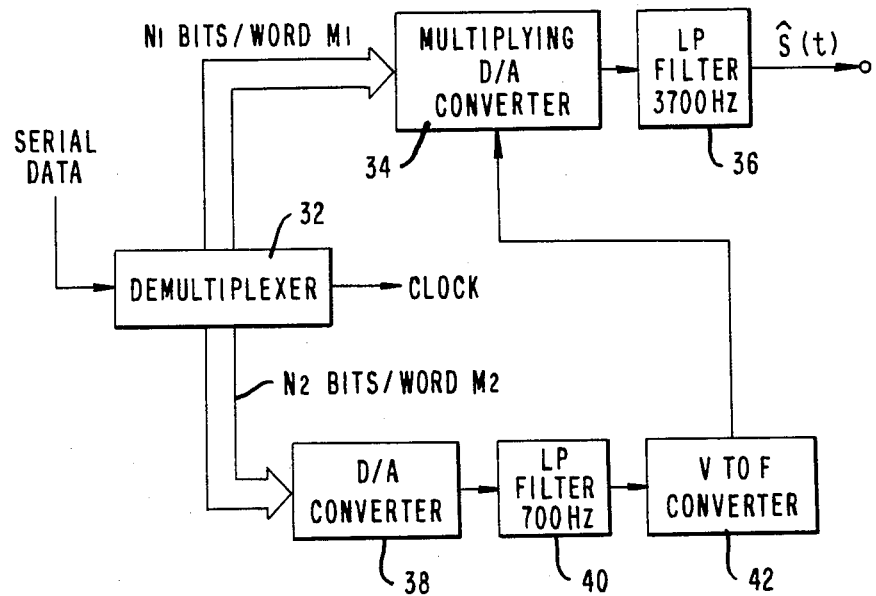
FIG. 3 is a block diagram of a decoder.

Referring now to FIG. 3 wherein the block diagram for a decoder that may be used with the encoder of the present invention is illustrated.

The serial data, if previously multiplexed, is demultiplexed by the demultiplexer 32 so as to place the M$_1$ signal in a first signal path and the M$_2$ signal in a second signal path. The first signal path along which the signal M$_1$ passes incorporates a multiplying digital-to-analog converter 34 to combine the amplitude information signal with the frequency information signal from a V-to-F converter 42. The combined signal from converter 34 is passed through a low-pass filter 36 to remove all signal components above 3700H$_z$ and to provide the reconstructed speech signal $\hat{S}(t)$.

The second signal path along which the signal M$_2$ passes incorporates a D-to-A converter (DAC) 38 for converting the digital signal M$_2$ to an analog signal which signal is filtered by a low-pass filter 40 to cut-off signal frequency components above 700H$_z$. The filtered voltage signal is directed to a V-to-F converter 42 which converter at its output provides the frequency information signal.

Figure 4:
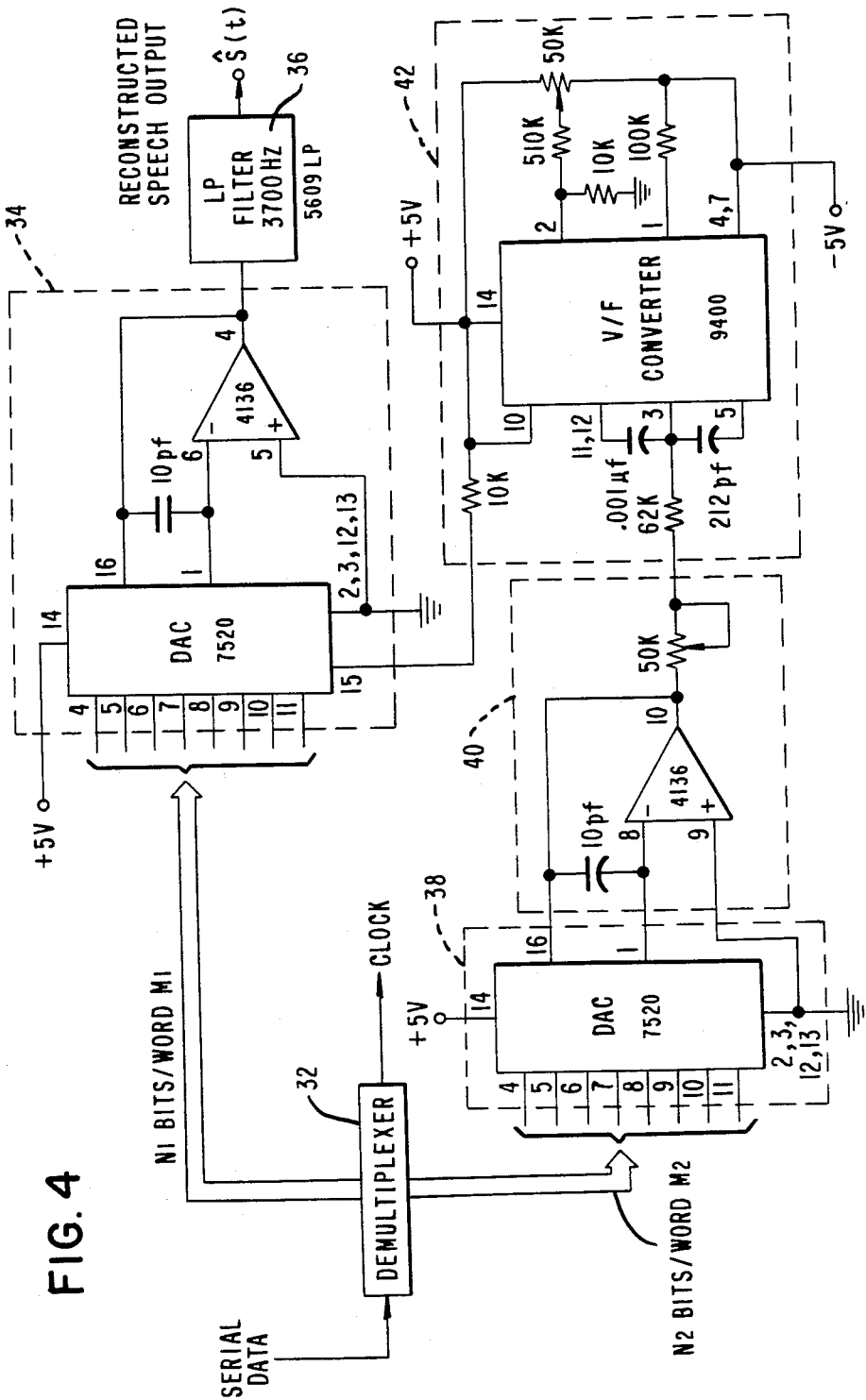
FIG. 4 is a schematic diagram of the preferred embodiment of the decoder of FIG. 3.
Figure 6:
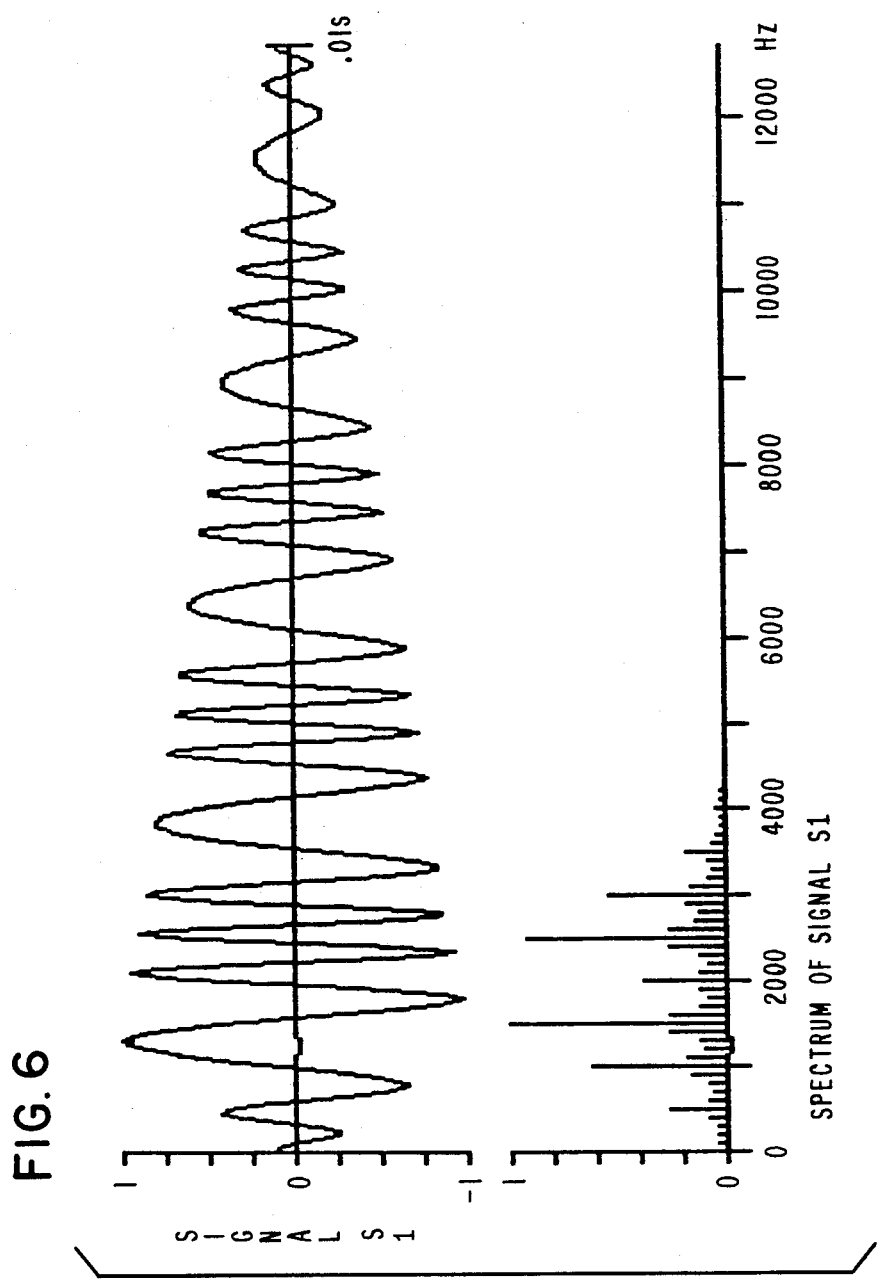
FIG. 6 illustrates a signal $S_1$ and its corresponding spectrum.
Figure 7:
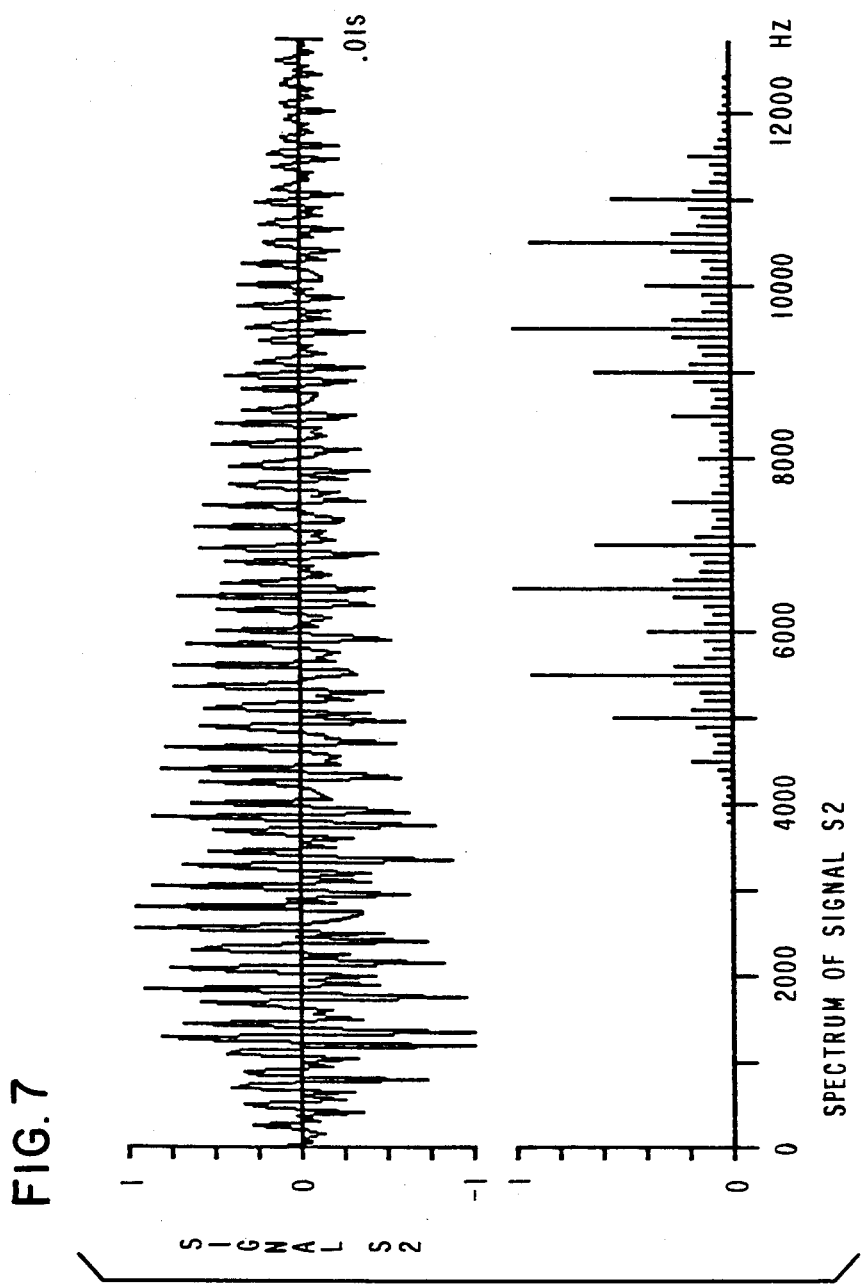
FIG. 7 illustrates a signal $S_2$ and its corresponding spectrum.
Figure 8:
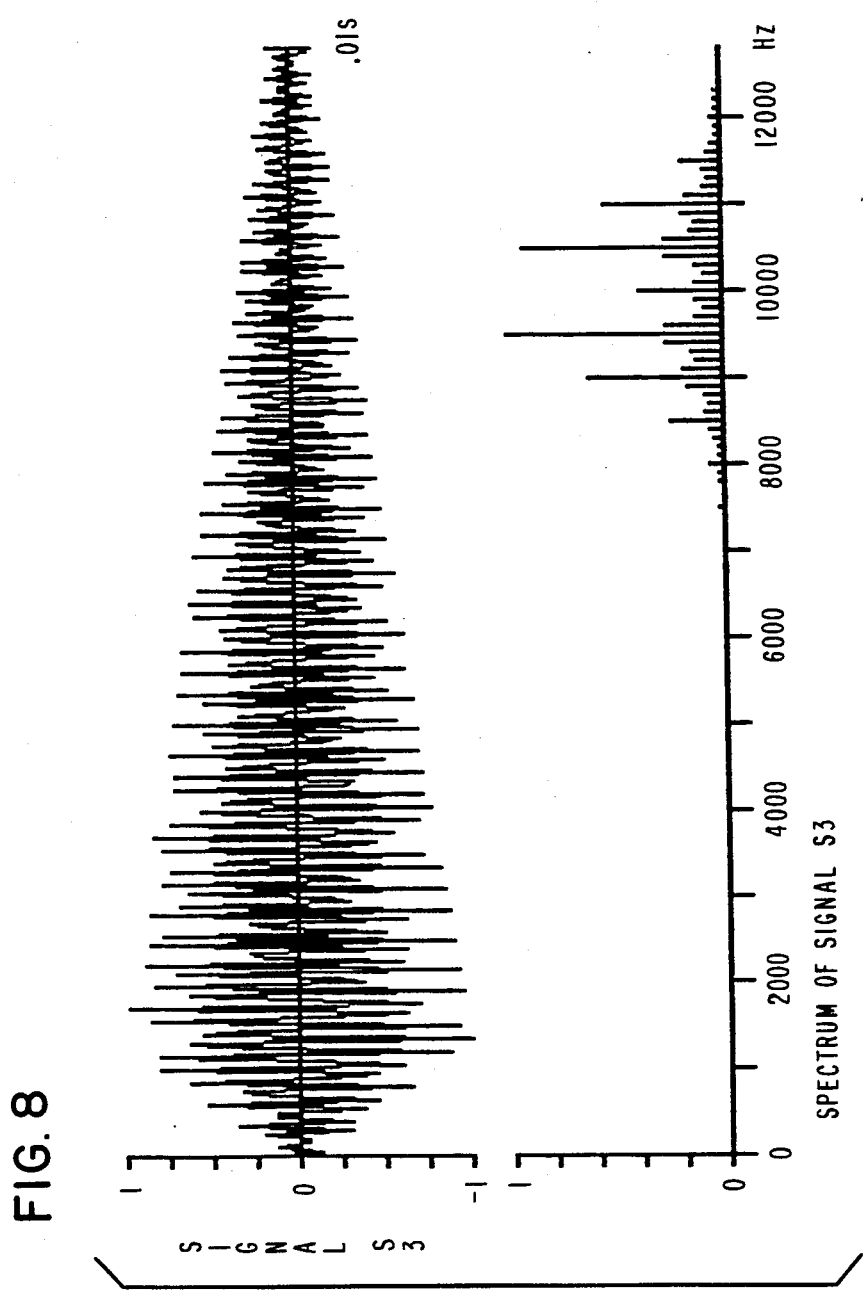
FIG. 8 illustrates a signal $S_3$ and its corresponding spectrum.

In FIG. 4 a detailed schematic of the decoder is illustrated. The demultiplexer 32 (if used) can be of any well-known type. The signals M$_1$ and M$_2$ are directed along the first and the second signal path, respectively. In the second signal path a 7520 DAC device 38 converts the input signal M$_2$ into an equivalent voltage signal which is a reconstructed form of the frequency information. The equivalent voltage signal is directed to the input of the low-pass filter 40. The filter is comprised of a 4136 operational amplifier having A.C. feedback and a 50K potentiometer connected to its output. The filter 40 is adjusted to cut-off frequency components above 700 H$_z$. The V-to-F converter 42 is comprised of a 9400 voltage-to-frequency device of the type manufactured by National Semiconductor. The converter 42 converts input voltage signals into a corresponding square wave output signal whose frequency is proportional to the voltage levels of the input signal.

Referring to the first signal path, the multiplying D/A converter 34 is comprised of a 7520 DAC device which receives as inputs the M$_1$ signal and the frequency modulated signal from the V-to-F converter 42, and functionally operates upon those signals to provide a product signal. The product signal is amplified by the 4136 operational amplifier and the amplified signal is filtered by the low-pass filter 36 to provide the reconstructed speech signal $\hat{S}(t)$. The filter removes all of the signal components above 3700H$_z$.

While there has been shown what is considered to be the preferred embodiment of the invention, it will be manifest that may changes and modifications may be made therein without departing from the essential spirit of the invention. It is intended, therefore, in the annexed claims, to cover all such changes and modifications as may fall within the true scope of the invention.

I claim:

1. An encoder for extracting and digitizing the amplitude and frequency information from an analog signal comprising:
   a first connector means for converting an analog signal, having amplitude and frequency information, to a single sideband signal;
   detector means for receiving said single sideband signal and for providing an envelope signal indicative of the amplitude of said single sideband signal;
   second converter means for converting said envelope signal to a first digital signal representative of the amplitude information of said analog signal;
   clipper means for receiving said single sideband signal and for removing the amplitude variations from said signal to provide a clipped signal carrying the frequency information;
   third converter means for converting said clipped signal to a voltage signal indicative of the frequency of the clipped signal; and
   fourth converter means for converting said voltage signal to a second digital signal representative of the frequency information of said analog signal.

2. The encoder according to claim 1 and further comprising multiplexer means for receiving said first and said second digital signals and for alternately providing said signals at an output.

3. The encoder according to claim 1 wherein said means first converter is comprised of:
   a band-pass filter for filtering the analog signal to retain a desired band of frequency components;
   a carrier signal generator for generating a carrier signal;
   a modulator means for receiving the band of frequency components from said band-pass filter and said carrier signal for modulating said carrier signal with said band of frequency components so as to provide a double sideband suppressed carrier signal; and
   filter means coupled to said modulator means for removing one sideband from said double sideband suppressed carrier signal to provide a single sideband suppressed carrier signal.

4. A decoder for reconstructing an analog signal from digital signals representing amplitude and frequency information comprising:
   a first signal path for receiving digital signal representing frequency information;
   a second signal path for receiving the digital signal representing amplitude information;
   a first converter means interposed in said first signal path for converting said digital signal representing frequency information into an analog signal representing frequency information;
   a filter means interposed in said first signal path for filtering high frequency components from the analog signal from said first converter means;
   a second converter means interposed in said first signal path for converting the filtered analog signal from said filter means to an output pulse train whose frequency is proportional to the voltage level of the filtered analog signal; and
   a third converter means interposed in said second signal path for receiving the digital signal representing amplitude information and the output pulse train from said second converter means for providing a reconstructed signal having both amplitude and frequency information.

5. A system for encoding and decoding a received analog signal comprising:
   (a) an encoder for encoding an analog signal into a first and a second digital signal, said encoder comprising:
   means for processing a received analog signal into a single sideband signal;
   means for providing a first digital signal representation of the amplitude variations of said single sideband signal; and
   means for providing a second digital signal representation of the frequency variations of said single sideband signal;
   (b) means for transmitting said first and said second digital signals to a decoder;
   (c) a decoder for receiving said first and said second digital signals and for providing a reconstructed analog signal, said decoder comprising:
   first connector means for converting said first digital signal to an analog signal having amplitude variations corresponding to the amplitude variations of said single sideband signal and for combining the amplitude variations of the analog signal with a frequency signal to reconstruct the received analog signal; and
   second converter means for converting said second digital signal to the frequency signal which signal is applied to said first converter means.

6. A method of encoding an analog signal comprising the steps of:
   (a) converting said analog signal to a single sideband signal;
   (b) converting the amplitude information of said single sideband signal to a first digital signal; and
   (c) converting the frequency information of said single sideband signal to a second digital signal, such that said first and said second digital signals represent the amplitude and the frequency information contained in said analog signal.

7. A method of decoding a first and a second digital signal representing the amplitude and the frequency information of an original analog signal, to reconstruct the original analog signal comprising the steps of:
   (a) converting said first digital signal to a first analog signal having amplitude variations corresponding to the amplitude information of the original analog signal;
   (b) converting said second digital signal to a second analog signal, the voltage levels of which correspond to the frequency information of the original analog signal;
   (c) converting the analog signal V of step (b) to a pulse train signal whose frequency is proportional to the voltage levels of said analog signal; and
   (d) multiplying the pulse train signal by the first analog signal to provide the amplitude information to the frequency information of the pulse train signal so as to provide a reconstructed original analog signal.

* * * * *

UNITED STATES PATENT AND TRADEMARK OFFICE
CERTIFICATE OF CORRECTION

PATENT NO. : 4,817,154

DATED : March 28, 1989

INVENTOR(S) : Elmer A. Hoyer

It is certified that error appears in the above-identified patent and that said Letters Patent is hereby corrected as shown below:

Column 7, line 37, delete "means first converter" and substitute --first converter means--.

Column 8, line 60, after the word "signal", delete "V".

Signed and Sealed this

Seventh Day of November, 1989

*Attest:*

JEFFREY M. SAMUELS

*Attesting Officer*     *Acting Commissioner of Patents and Trademarks*